Feb. 24, 1948.
L. F. KULESH
2,436,476
METHOD OF MAKING A GARDEN TOOL
Filed June 11, 1945
2 Sheets-Sheet 1
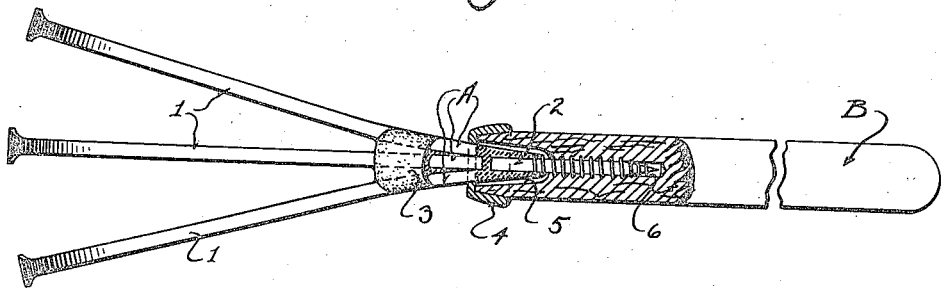
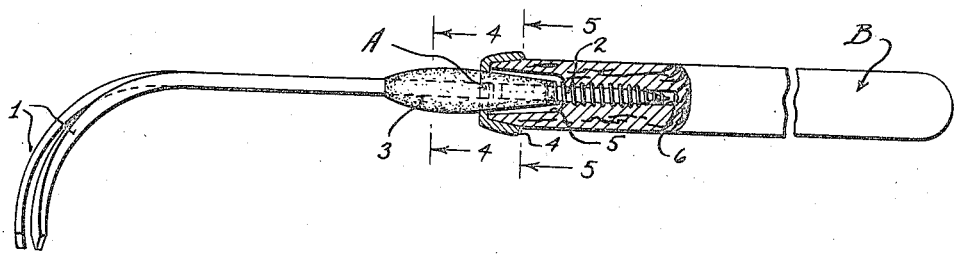
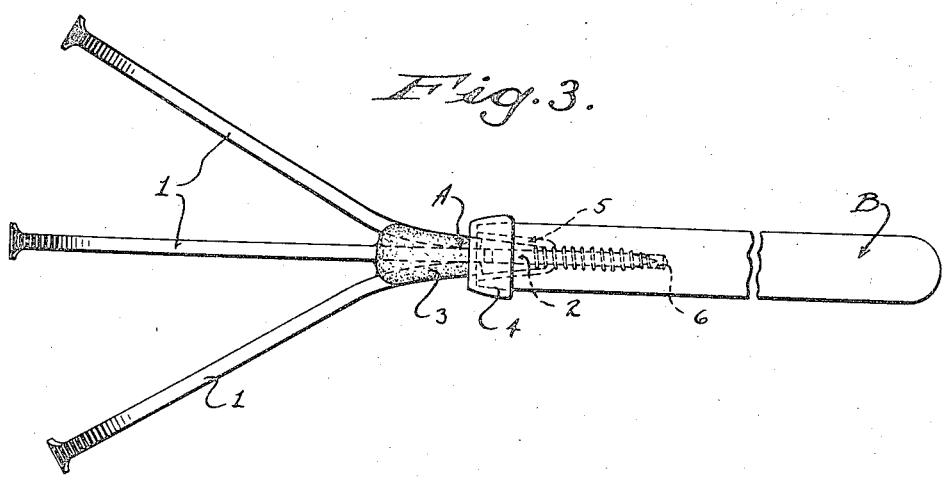
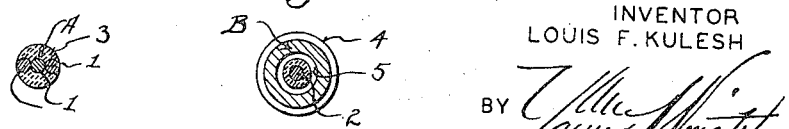
INVENTOR
LOUIS F. KULESH
BY
ATTORNEYS Feb. 24, 1948.                L. F. KULESH                 2,436,476
                    METHOD OF MAKING A GARDEN TOOL
                        Filed June 11, 1945          2 Sheets-Sheet 2
Fig. 6.
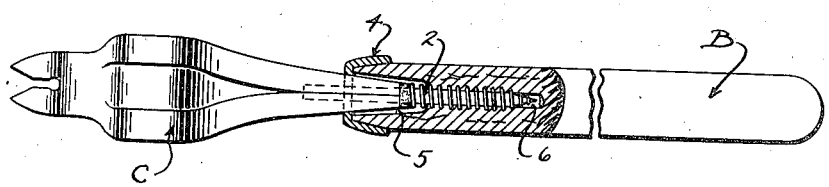
Fig. 8.
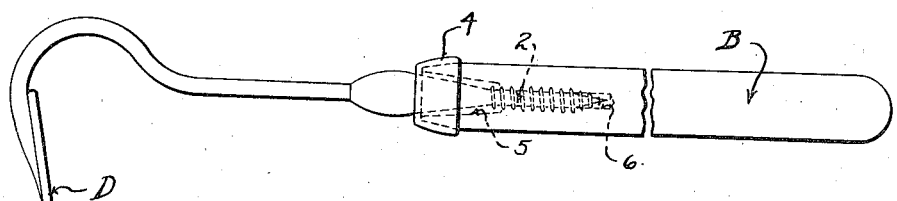
Fig. 9.
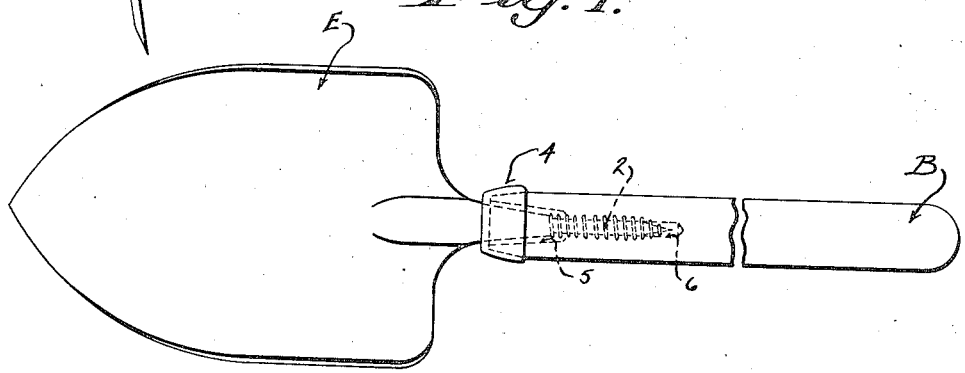
Fig. 7.
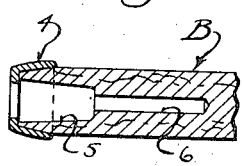
INVENTOR
LOUIS F. KULESH
ATTORNEYS Patented Feb. 24, 1948

2,436,476

UNITED STATES PATENT OFFICE 2,436,476

METHOD OF MAKING GARDEN TOOLS

Louis F. Kulesh, Kenosha, Wis.

Application June 11, 1945, Serial No. 598,868

2 Claims. (Cl. 76—111)

My invention refers to garden tools and it has for its primary object to provide a method for producing a toothed hand tool, wherein the mesh of the teeth may be varied by manually contracting the space therebetween or spreading the same apart for certain work.

Another object of my invention is to provide a removeable coupling connection between any type of tool and a common handle, whereby a set of such tools is furnished with one handle to materially reduce the cost of the set and at the same time render interchangeability of the tools demanded for all special work.

Another specific object of my invention is to provide a wrist joint for a series of spring teeth, produced by a method of depositing a mass of metal at the joint, and subjecting the same to a heat welding operation to soften the temper of the steel at the joint, whereby the teeth are rendered pliable adjacent the joint. Thus the teeth may be, under manual pressure, spread wider apart or close together to accommodate the tool for different soil work.

Another object of my invention is to provide a tool and handle coupling, the tool having a tapered shank-base, terminating with a threaded plug adapted to wedge fit into a handle socket. The socket is formed with a reduced smooth bore, and the screw plug will enter said bore and cut therein its own thread union, whereby the joint parts are brought snugly together and will draw the same, to frictionally bind the coupled parts.

A still further object of my invention is to provide the socketed end of the handle with a metallic thimble pressed thereon, adapted to engage the tapered base of the tool, when said tool and handle are drawn together by the screw threaded connection.

With the above and other minor objects in view, my invention consists in certain peculiarities of construction and combination of parts as will be fully set forth hereinafter with reference to the accompanying drawings and subsequently claimed.

In the drawings:

Figure 1 represents a plan view of a toothed tool illustrating my invention, with parts broken away and in section to more clearly illustrate structural features, the teeth being illustrated as compressed or contracted.

Figure 2 is a side elevation of the same, with parts in section to more clearly illustrate details of construction.

Figure 3 is a plan view of the same, illustrating the teeth spread apart.

Figure 4 is a detailed cross section of the tool shank, as indicated by line 4—4 of Figure 2.

Figure 5 is a another cross section, as indicated by line 5—5 of Figure 2.

Figure 6 is a plan view illustrating a weed extracting garden tool coupled with a handle embodying certain features of my invention.

Figure 7 is a detailed fragmental sectional view through the handle illustrating the socket thereof, prior to receiving a threaded plug.

Figure 8 is a side elevation of a hoe associated with the handle coupling. And

Figure 9 is a plan view of a spade tool fitted into the handle.

Referring by characters to the drawings, 1 indicates a series of flared hardened steel teeth, having their shank portions brought together, as indicated at A. Aligned with the center tooth is a screw threaded plug 2, of the wood screw type. The parts so assembled, at the shank, have fitted thereabout a metal filling 3, which filling is subjected to a brazing or welding heat, to form a tapered shank base having extended rearwardly therefrom a threaded plug. Thus when the tool is completed, the rear end of the same is in the form of a tang.

Due to the fact that the filling has been subjected to a high temperature where the prongs are exposed or extended from the shank, they will be slightly softened, whereby they are of sufficient pliability so as to be drawn together, as indicated in Figure 1, by manual compression, or the tangs may be spread apart, as indicated in Figure 3 of the drawings.

A handle B, of any desired length, is provided and is composed preferably of wood or other fibrous material. The bottom end of the handle has tightly fitted thereover an apertured thimble 4, which thimble protects a socket in the end of the handle. The socket is formed with an enlarged mouth section 5 and a contracted smooth bored section 6. It is understood that the coupling between the handle and tool, just described, may be used with a variety of forms of tools and, in practice, a set of such tools is provided with each handle or, for example, in some instances the set may embody a short handle and a long handle.

From the foregoing description it is manifest that when the tool is inserted in the handle and rotated relative thereto, the screw threaded plug will enter the smooth bore 6 and thus cut its own threads within said bore, whereby the tool is drawn tightly into the handle and locked therein due to the fact that the tapered edges of the shank will bind against the opening of the ferrule 4, as clearly shown in the drawings.

It will also be apparent that in the method of forming the tool shank, the metal binding the parts is subjected to welding and will fuse throughout its surface to thus firmly develop a base with rearwardly inclined walls, as shown.

Referring particularly to Figures 6 through 9 inclusive, I have illustrated a series of interchangeable tools to be used in connection with the handle, and in said illustrations Figure 6 discloses a weed puller C, Figure 8 a hoe D, and Figure 9 a spade or trowel E, all of which tools are provided with tapered shanks or tangs adapted to be inserted into the handle embodying a coupling unit, as previously described.

It is further understood that in some instances, where the prongs are employed as a tool, I may multiply the series of said prongs to produce a rake or fork.

Changes in details may be made without departing from the spirit or the scope of my invention, but what I claim as new is:

1. A method of producing a spring toothed garden tool consisting of assembling a series of separate spring teeth at their shank base, abutting a threaded plug to the base, depositing a mass of metal thereon, subjecting said mass to a welding heat to develop a solid joint, whereby the teeth adjacent the joint are rendered pliable to be selectively spread apart or drawn together.

2. A method of producing a toothed garden tool consisting of assembling the shanks of a series of separate teeth, fitting thereto a centrally disposed threaded plug, depositing a metal filler thereabout, subjecting the filler to a welding heat to form a solid tapered tang for attachment to a handle, the welding heat serving to render pliable each tooth at its base to permit spreading the teeth apart or draw them together.

LOUIS F. KULESH.

REFERENCES CITED

The following references are of record in the file of this patent:

UNITED STATES PATENTS

| Number | Name | Date |
|--------|------|------|
| 180,041 | Kretainger | July 18, 1876 |
| 334,551 | Wawrinsky | Jan. 19, 1886 |
| 1,171,764 | Barden | Feb. 15, 1916 |
| 1,772,181 | Hightower | Aug. 5, 1930 |
| 2,421,990 | Bumgarner | June 10, 1947 |